Patented Nov. 17, 1931

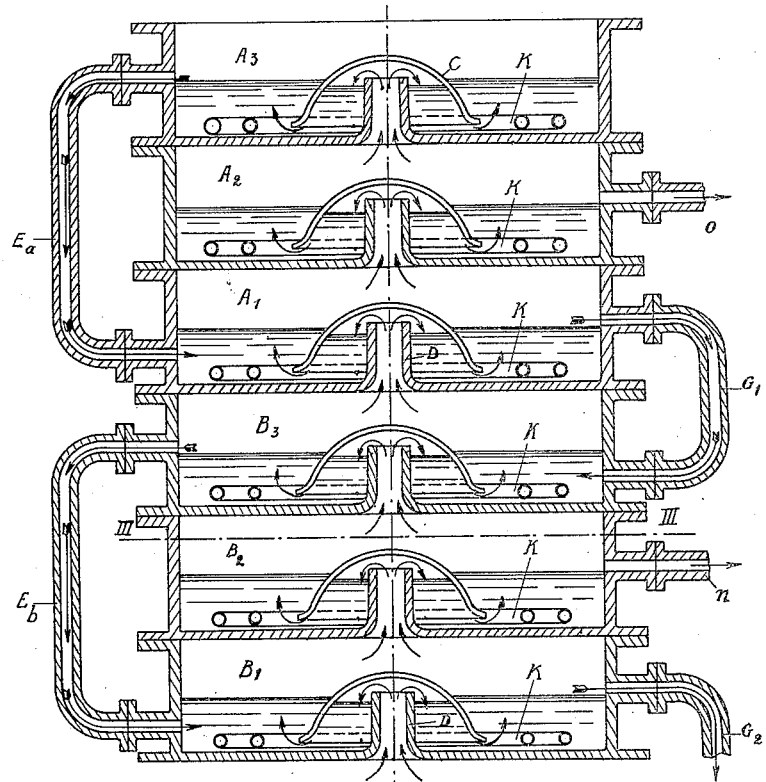
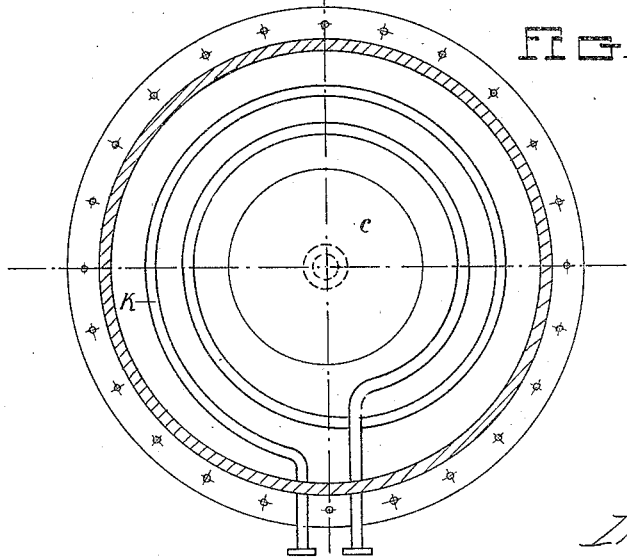

1,832,800

UNITED STATES PATENT OFFICE

EDMOND VOITURON, OF BRUSSELS, BELGIUM, ASSIGNOR TO SOCIETE ANONYME D'OUGREE MARIHAYE, OF OUGRE, BELGIUM

DEVICE FOR THE FRACTIONAL DISTILLATION AND CONDENSATION OF COMPLEX MIXTURES

Application filed September 3, 1925, Serial No. 54,353, and in France September 8, 1924.

This invention relates to the fractional distillation and condensation of mixtures of liquid hydrocarbons, comprising for example petroleum oils, tar oils, liquids obtained from the distillation of coal and the like.

In the existing processes for the distillation of liquids of this kind, for example complex mixtures of hydrocarbons obtained by absorbing in heavy tar oil the aromatic hydrocarbons contained in coke oven gases, this heavy tar oil or saturated washing oil is treated in an ordinary distilling column and the products of the distillation are condensed together in a single condenser in order to obtain a light oil called crude benzol. This crude benzol is then subjected to fractional distillation in a suitable column or retort, for the purpose of separating the different constituents such as benzol, toluol, xylol, etc., which are combined in the crude benzol.

The object of the invention is to obviate any subsequent fractional distillation in processes of this type and to obtain directly and separately the constituents of complex mixtures of hydrocarbons.

The process according to the invention is characterized essentially by a cycle of fractional condensation in which the complex vapours, from any distilling apparatus, pass through products of condensation which become progressively lighter, in separate zones which are successively a lower, mean and upper zone of a cooling column in which the said products of condensation may flow, in an opposite direction to the vapours, from the upper zones to the lower zones without entering the mean zones where the definite pure products are collected.

Other details of the invention stand out from the following description with reference to the accompanying drawings in which:—

Figure 2 shows in section a form of construction of a port of a cooling column.

Figure 3 is a section in plan taken along the line III—III in Figure 2.

Figure 1:
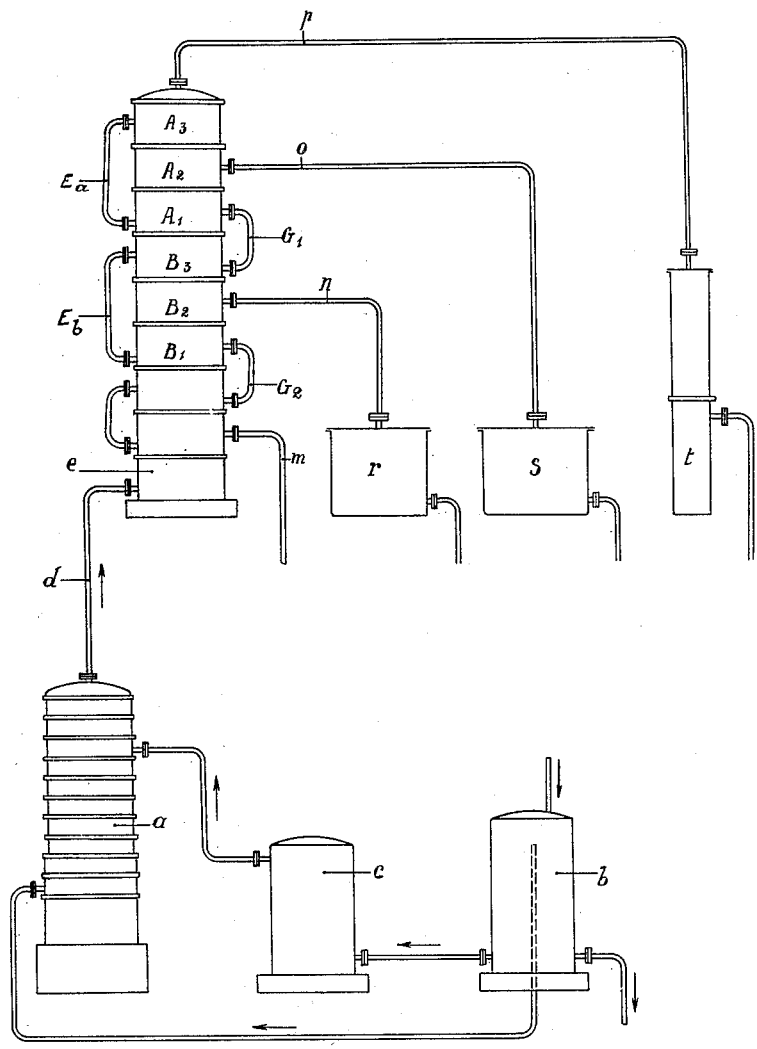
Figure 1 shows diagrammatically the application of the invention to the fractional distillation of crude benzols.

As shown in Figure 1, in the case of the distillation of crude benzol, an ordinary deessencing column or apparatus $a$, the benzolated oil of which is previously reheated by an exchanger $b$ and a reheater $c$, distils the complex mixture of hydrocarbon vapours. These vapours are led directly, through the pipe $d$, to a condensing column $e$ the details of which are shown in Figures 2 and 3.

As shown in Figures 2 and 3, the column consists of superposed sections forming successive groups such as $A_1$, $A_2$, $A_3$ and $B_1$, $B_2$, $B_3$, and each section forms a chamber of condensation. All the condensing chambers $A_1$, $A_2$, $A_3$, $B_1$, $B_2$, $B_3$, communicate with each other through a central duct $D$ with which they are provided and above which is provided a bell $C$ which forms a baffle the object of which is to compel the vapours entering through the ducts $D$ to pass through the condensed liquid contained in each section or chamber of condensation before passing on to the next one.

These groups of three sections communicate with each other through an arrangement of overflow pipes arranged in such a way that in each group an upper chamber, for example $A_3$, communicates with the lower chamber $A_1$ through a pipe $E_a$ and each lower chamber $A_1$ of the group communicates with the top chamber $B_3$ of the next group below it through a pipe $G_1$. In each group the middle chambers $A_2$, $B_2$ . . . etc. are provided with outlet pipes $n$, $o$ . . .

For the purpose of regulating the temperature of condensation each section or chamber of condensation is provided with a cooling coil $K$. All the cooling coils of the column may be connected in series to produce a circulation of the cooling medium from the top towards the base of the column, that is to say flowing in the opposite direction to the vapours rising from the bottom to the top. However, in certain cases, it may be advantageous to mount the coils in parallel in such a way as to be able to regulate the temperature of each section of the column independently.

In the device described the vapours are condensed successively in the lower and upper sections into liquid mixtures still more or less complex, but having progressively lower boiling points according as the vapours rise higher in the column.

As shown in the large barbed arrows (Figure 2), the arrangement of pipes $E_a$, $G_1$, $E_b$, $G_2$ . . . , provides a path of circulation for the condensed products which brings them gradually towards the base of the column. These condensed products are thus, in their flow, traversed by the vapours which, from section to section, impoverish them of more volatile constitutents which these vapours carry upwards, while in the mean chambers of condensation of each group of sections which are not traversed by the reflux of the condensed products, there are obtained separately definite liquid products having a known boiling point. It follows that in the case of the distillation of benzolated oils, given herein by way of example, the solvent may be recuperated, in a continuous manner, directly at the base of the column through the pipe $m$. The xylol is directly collected through the pipe $n$ of $B_2$ and the toluol through the pipe $o$ of $A_2$. These liquid products are received in corresponding separate reservoirs $r$ and $s$, while the lighter vapours of pure benzol issuing from the upper part of the column pass out through a pipe $p$ which leads them to a cooler $t$ upon outlet from which pure benzol is collected.

What I claim is:—

1. In an apparatus for the fractional condensation and the separation of different constituents of vaporous products derived from the fractional distillation of hydrocarbons such as petroleum oil, tar oil, coal or the like, a fractionating column comprising several superposed sections, each section comprising at least three chambers, one intermediate chamber of each section forming a separation chamber from which a fraction is withdrawn, a central pipe located in each of said chambers and adapted to permit the upward passage of the gaseous products, a bell located above said pipe in each chamber for compelling the gaseous products to come into contact with the condensed liquid in each chamber, temperature control coils located in each chamber in the condensed liquid therein, external pipe connections between the top and bottom chambers of each section and between the bottom chamber of one section and the top chamber of the section located immediately below said first named section to permit the downward passage of the reflux without being mixed with the liquid contained in the intermediate separation chambers so that the variations of yield and composition of the reflux have no influence upon the temperature of the separation chambers, outlets upon said intermediate separation chambers and a vapor inlet and outlet at the bottom and top respectively of said column.

2. In an apparatus for the fractional condensation and separation of different constituents of vaporous products derived from the fractional distillation of hydrocarbons such as petroleum oil, tar oil, coal or the like, a fractionating column comprising a plurality of superposed sections, each of said sections comprising at least three chambers, certain intermediate chambers of each section forming separation chambers from which fractions are withdrawn, a central pipe located in each of said chambers adapted to permit the upward passage of the gaseous products, a bell located above said pipe in each chamber for compelling the gaseous products to come into contact with the condensing liquid in each chamber, temperature control coils located in each chamber in the condensed liquid therein, external pipe connections between the top and bottom chambers of each section and between the bottom chamber of one section and the top chamber of the section located immediately below said first named section to permit downward passage of the reflux without being mixed with the liquid contained in said intermediate separation chambers so that the variations of yield and composition of the reflux have no influence upon the temperature of said separation chambers, outlets upon said intermediate separation chambers and a vapor inlet and outlet at the bottom and top respectively of said column.

In testimony whereof I have signed my name to this specification.

EDMOND VOITURON.